United States Patent
Choo (10) Patent No.: US 9,355,259 B1
(45) Date of Patent: May 31, 2016

(54) METHOD AND APPARATUS FOR ACCESSING SENSITIVE INFORMATION ON-DEMAND

(71) Applicant: Flexera Software LLC, Itasca, IL (US)

(72) Inventor: Jia Hua Choo, Melbourne (AU)

(73) Assignee: FLEXERA SOFTWARE LLC, San Jose, CA (US)

( * ) Notice: Subject to any disclaimer, the term of this patent is extended or adjusted under 35 U.S.C. 154(b) by 0 days.

(21) Appl. No.: 14/726,166

(22) Filed: May 29, 2015

(51) Int. Cl.
*H04L 29/06* (2006.01)
*G06F 21/60* (2013.01)
*G06F 21/62* (2013.01)
*H04L 9/08* (2006.01)

(52) U.S. Cl.
CPC .......... *G06F 21/602* (2013.01); *G06F 21/6245* (2013.01); *H04L 9/0863* (2013.01); *H04L 9/0869* (2013.01); *G06F 21/6209* (2013.01)

(58) Field of Classification Search
None
See application file for complete search history.

(56) References Cited

U.S. PATENT DOCUMENTS

| 2006/0156026 A1* | 7/2006 | Utin ........................ G06F 21/31 713/183 |
| 2014/0013112 A1* | 1/2014 | Cidon ................. G06F 21/6218 713/165 |
| 2015/0381610 A1* | 12/2015 | Poornachandran . H04L 63/0853 713/155 |

* cited by examiner

*Primary Examiner* — Hadi Armouche
*Assistant Examiner* — Andrew Steinle
(74) *Attorney, Agent, or Firm* — Michael A. Glenn; Perkins Coie LLP (57) ABSTRACT

Exposure of sensitive tenant information is minimized in a multi-tenant/multi-user environment. A unique encryption key is provided for each tenant. The tenant encryption key is never stored in the clear and each copy of the tenant encryption key is protected by a user derived password. A secure folder is created for each tenant and encrypted by the tenant encryption key. Secure folders are mounted only on-demand, i.e. when an authenticated request is received for that tenant. The secure folders are mounted only for specific durations only. Otherwise, they are un-mounted. When a secure folder is mounted, any read/write operation to the secure folder is encrypted/decrypted on-the-fly. When the secure folder is un-mounted, all file contents in the secure folder, and the secure folder itself, are not visible in the file system and no application can browse to the secure folder without the tenant encryption key.

21 Claims, 7 Drawing Sheets

METHOD AND APPARATUS FOR ACCESSING SENSITIVE INFORMATION ON-DEMAND

FIELD

The invention relates to securing sensitive information in a computer environment. More particularly, the invention relates to a method and apparatus for accessing sensitive information on-demand.

BACKGROUND

Sensitive information, such as configuration settings, connection strings, passwords, etc. is often stored in a database. Anyone having database access is able to query this information. Encrypting the information that is stored in the database helps to protect such information. Unfortunately, it is a common practice for software engineers to store the encryption key in the database. This is well known by hackers. Thus, in a multi-tenant/multi-user environment, an insider can potentially gain access to all of the tenant and/or user information within the database. This exposes the tenant's sensitive information to mischief.

It would be advantageous to ensure that the exposure of sensitive tenant information, including such exposure to insiders, is minimized.

SUMMARY

Embodiments of the invention ensure that the exposure of sensitive tenant information, including such exposure to insiders, is minimized. Embodiments of the invention concern multi-tenant/multi-user environments. For purposes of the discussion herein, multi-tenancy refers to a software architecture in which a single instance of a software runs on a server and serves multiple tenants.

In embodiments of the invention, a unique encryption key is provided for each tenant. This tenant encryption key is never stored in the clear. Thus, each copy of the tenant encryption key is protected, for example using the Advanced Encryption Standard (AES), e.g. AES-256, by a user derived password, for example Password-Based Key Derivation Function 2 (PBKDF-2). Those skilled in the art will appreciate that other encryption standards and key derivation functions may be used in connection with the invention.

In embodiments of the invention, the user is a Flexera® Engenius NMS suite (FNMS) operator and/or administrator. Those skilled in the art will appreciate that the invention is applicable to other such systems.

A secure folder is created for each tenant and encrypted by the tenant encryption key. Secure folders are mounted only on-demand, i.e. when an authenticated request is received for that tenant. The secure folders are mounted for specific durations only. When a secure folder is mounted, any read/write operation to the secure folder is encrypted/decrypted, e.g. using AES-256, on-the-fly. When the secure folder is un-mounted, all file contents in the secure folder, and the secure folder itself, are not visible in the file system. Thus, no application is able to browse to the secure folder without the tenant encryption key. In this way, the exposure of sensitive tenant information, including such exposure to insiders, is minimized.

DESCRIPTION

Embodiments of the invention ensure that the exposure of sensitive tenant information, including such exposure to insiders, is minimized. Embodiments of the invention concern multi-tenant/multi-user environments. For purposes of the discussion herein, multi-tenancy refers to a software architecture in which a single instance of a software runs on a server and serves multiple tenants. A tenant is a group of users who share a common access with specific privileges to the software instance. With a multitenant architecture, a software application is designed to provide every tenant a dedicated share of the instance, including its data, configuration, user management, tenant individual functionality and non-functional properties. Multi-tenancy contrasts with multi-instance architectures, where separate software instances operate on behalf of different tenants. Multi-tenancy is considered to be an important feature of cloud computing.

In embodiments of the invention, a unique encryption key is provided for each tenant. This tenant encryption key is never stored in the clear. Thus, each copy of the tenant encryption key is protected, for example using the Advanced Encryption Standard (AES), e.g. AES-256, by a user derived password, for example Password-Based Key Derivation Function 2 (PBKDF-2), which is a key derivation function that is part of RSA Laboratories' Public-Key Cryptography Standards (PKCS) series, specifically PKCS #5 v2.0, also published as Internet Engineering Task Force's RFC 2898. Those skilled in the art will appreciate that other encryption standards and key derivation functions may be used in connection with the invention.

In embodiments of the invention, the user is a Flexera® Engenius NMS suite (FNMS) operator and/or administrator. Those skilled in the art will appreciate that the invention is applicable to other such systems.

A secure folder is created for each tenant and encrypted by the tenant encryption key. Secure folders are mounted only on-demand, i.e. when an authenticated request is received for that tenant, and for specific durations only. Otherwise, they are un-mounted. When a secure folder is mounted, any read/write operation to the secure folder is encrypted/decrypted (AES-256) on-the-fly. When the secure folder is un-mounted, all file contents in the secure folder, and the secure folder itself, are not visible in the file system. Thus, no application is able to browse to the secure folder without the tenant encryption key. In this way, the exposure of sensitive tenant information, including such exposure to insiders, is minimized.

Figure 1:
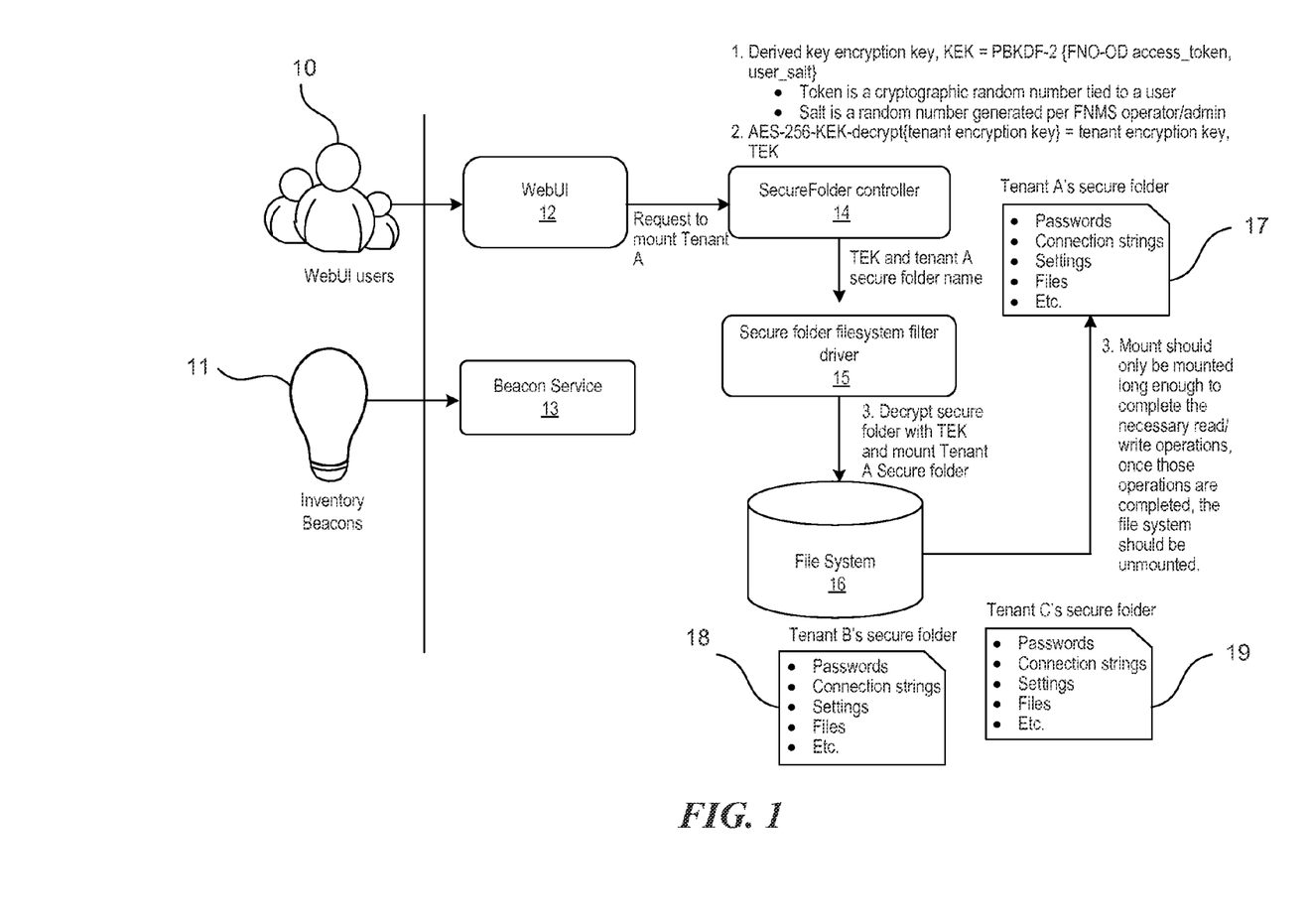
FIG. 1 is a block schematic diagram showing the mounting of a secure folder according to the invention.

FIG. 1 is a block schematic diagram showing the mounting of a secure folder according to the invention.

In FIG. 1, a multi-tenant file system 16 includes a beacon service 13 that receives inventory beacons 11. Such beacons are found, for example, in Flexera's FlexNet Manager Suite, which provides mechanisms for application discovery and inventory to ensure that an organization can determine how many licenses it is consuming. The inventory beacon provides cross-platform (Windows, Linux, UNIX, and MAC OS) discovery, inventory, and application usage data collection at the customer site and securely uploads this data to the cloud. It also performs discovery and inventory of virtual machines for VMware ESX/vSphere and Microsoft Hyper-V servers, and supports Citrix XenApp application virtualization environments. In addition, the inventory beacon is integrated with a multitude of third-party standard inventory sources including Symantec Altiris, BMC Atrium Discovery and Dependency Mapping (ADDM), BladeLogic Client Automation (Marimba), HP Discovery and Dependency Mapping Inventory (DDMI), IBM License Metric Tool (ILMT), Microsoft System Center Configuration Manager (SCCM), and IBM Tivoli Endpoint Manager (BigFix), etc. Such inventory beacons are known in the art.

The file system is accessible within the confines of the herein disclosed invention by tenant users 10 via a Web or application interface 12. Embodiments of the invention comprise a secure folder controller 14 that intermediates tenant user access with a secure folder file system filter driver 15 for file system 16 access. The file system itself contains secure folders for each of a plurality of tenants, e.g. Tenant A 17, Tenant B 18, and Tenant C 19. Each tenant's secure folder contains such information as passwords, connection strings, settings, files, and the like.

Tenant access to the tenant's secure folder requires an encryption key which, in an embodiment of the invention is protected by a derived key encryption key:

$$KEK=PBKDF\text{-}2\{access\_token, user\_salt\}$$

where the access_token is a cryptographic random number tied to a user, and the salt is a random number generated per an operator and/or administrator.

The tenant encryption key (TEK) in an embodiment is a cryptographic random value. TEK is protected as follows:

$$encrypted\text{-}TEK=AES\text{-}256\text{-}KEK\text{-}encrypt\{TEK\}.$$

Thus, the KEK is the key used to encrypt/decrypt the TEK which, in turn, is the key used to encrypt/decrypt the actual tenant folder.

Those skilled in the art will appreciate that the KEK and the TEK may be generated and protected using any known cryptography scheme.

When a user in a tenant, e.g. Tenant A, wants to access the contents of its secure folder, the tenant provides a request to mount, e.g. mount Tenant A, to the secure folder controller via a Web or application interface. The secure folder controller provides the TEK, mount duration, and Tenant A secure folder name to the secure folder file system filter driver, which decrypts the secure folder in the file system using the TEK and which then mounts the requested Tenant A secure folder. The mount duration can be derived from hard disk performance matrixes. For example:

$$\text{Duration}=\text{Size of secure folder/sector size} \times (T_{seek}+T_{rotation}+T_{transfer})$$

where sector size is the number of bytes per file system sector, $T_{seek}$ is the time taken to seek to a sector on the disk, $T_{rotation}$ is the time taken for the harddisk to rotate to the sector, and $T_{transfer}$ is the disk transfer rate.

The secure file system filter driver can then mount the requested Tenant A secure folder for the specified duration. The secure folder is only mounted long enough to complete the necessary read/write operations. The secure folder is unmounted when the mount duration expires or when the secure file system controller initiates an un-mount operation.

Figure 2:
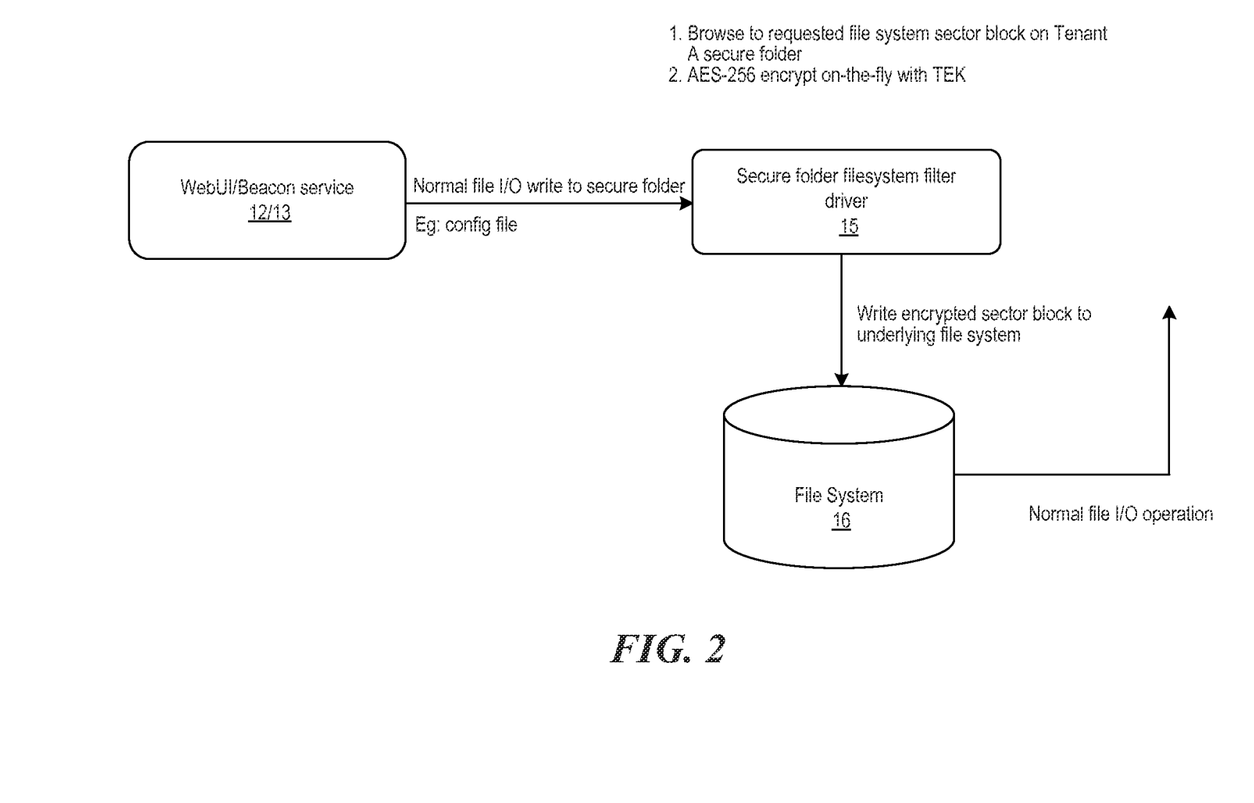
FIG. 2 is a block schematic diagram showing writing to a secure folder according to the invention.

FIG. 2 is a block schematic diagram showing writing to a secure folder according to the invention.

In FIG. 2, a file I/O write operation to a secure folder, e.g. by Tenant A for a configuration file, is initiated via a Web or application interface 12/13. The system browses to the requested file system sector block on the Tenant A secure folder via the secure folder file system filter driver. In an embodiment of the invention, AES-256 is used to encrypt the file on-the-fly with the TEK, and the encrypted sector block is written to the underlying file system using normal file I/O operations.

Figure 3:
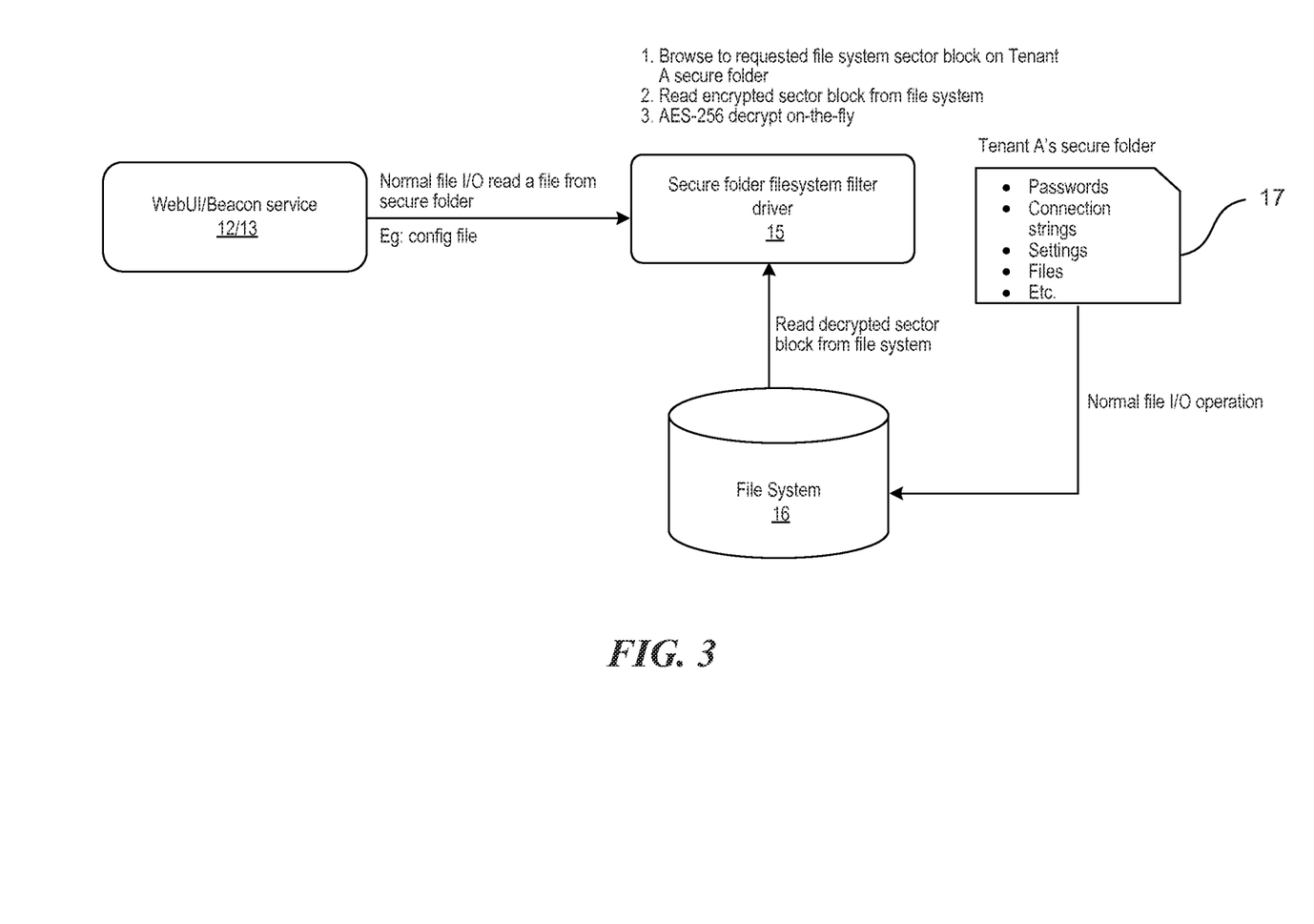
FIG. 3 is a block schematic diagram showing reading from a secure folder according to the invention.

FIG. 3 is a block schematic diagram showing reading from a secure folder according to the invention.

In FIG. 3, a file I/O read operation for a file, such as a configuration file, from a secure folder, e.g. by Tenant A, is initiated via the Web or application interface 12/13. The system browses to the requested file system sector block on the Tenant A secure folder via the secure folder file system filter driver. The system reads the encrypted sector block from file system. In an embodiment of the invention, AES-256 is used to decrypt the file on-the-fly. The decrypted sector block is then read from the file system using file I/O operations.

Figure 4:
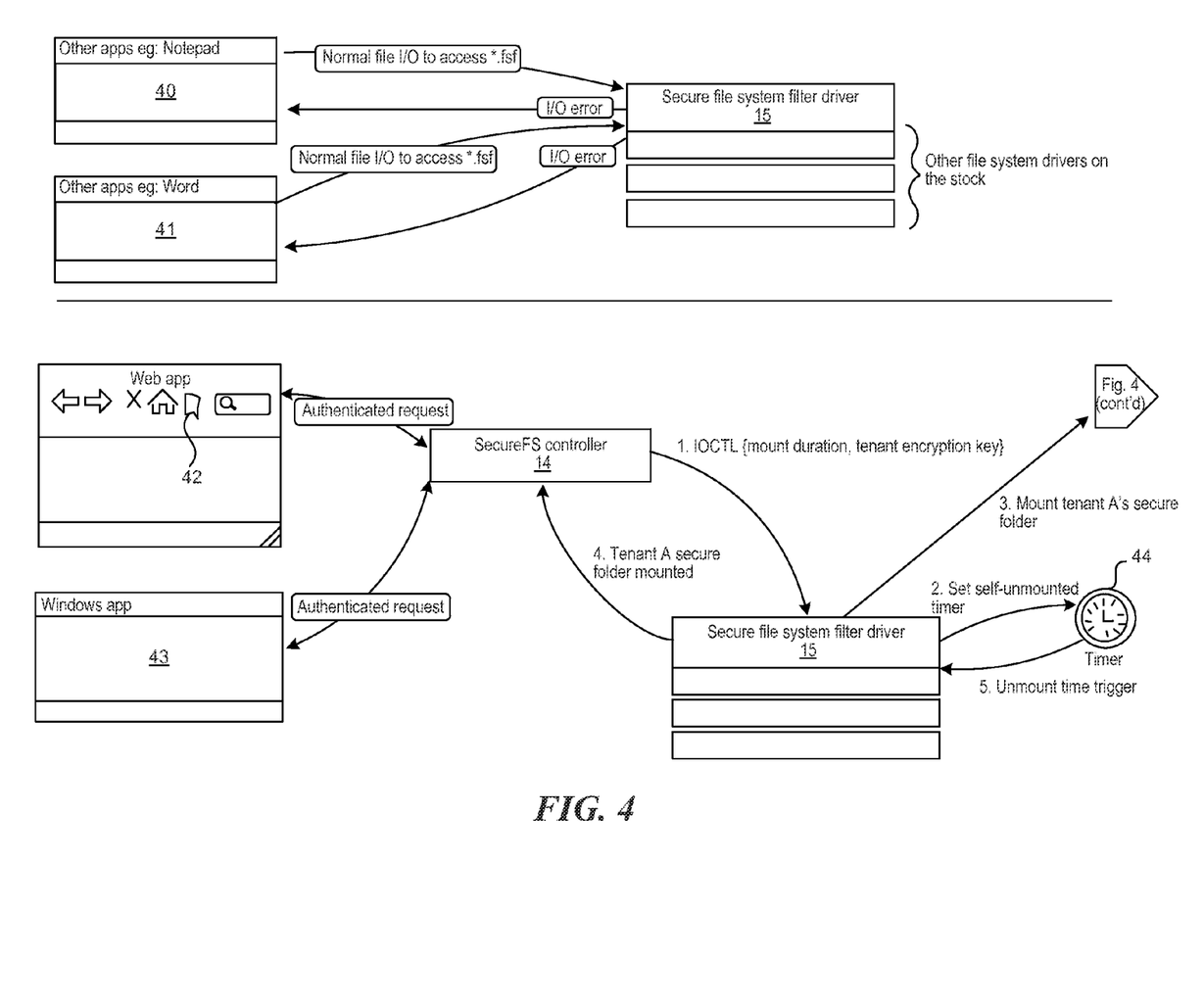
FIG. 4 is a detailed block schematic diagram showing a secure folder system according to the invention.

FIG. 4 is a detailed block schematic diagram showing a secure folder system according to the invention.

In FIG. 4, a file I/O access from a user application, such as Notepad 40 or Word 41, to a secure folder (*fsf) is intercepted by the secure file system filter driver 15 and rejected.

An authenticated input/output/control (IOCTL) request, such as from a Web application 42 or Windows application 43 is received by the received by the secure file system controller 14. The IOCTL includes information regarding mount duration and the TEK. In embodiments of the invention, mount duration is derived by current I/O state or the amount of data required from secure folder. In embodiments of the invention, signatures are provided for the authenticity of the IOCTL requests, although this is not necessary for the practice of the invention.

The secure file system filter driver sets a mount duration timer 44 and mounts the secure folder of interest, e.g. the Tenant A folder 17. Once a secure file is mounted, any file read is decrypted using the tenant encryption key and any file write is encrypted, as described above. In this example, the Tenant A folder contents 17' include such items are passwords, encryption keys, connection strings, profiles, and the like. These items may be accessed only so long as the secure folder is mounted, as determined by the self unmount timer. After the mount duration timer times out, an unmount time trigger is issued that causes the secure folder to be unmounted from the file system. Thus, in this example when the mount duration is up, the secure file system filter driver self-unmounts the Tenant A secure folder. The secure file system filter driver enforces a hard limit, e.g. one second, on the mount duration. If the mount duration requested by the controller is larger than the hard limit, the self-unmount mechanism is executed to ensure that exposure of contents in the secure folder is minimal. In this way, the exposure of sensitive tenant information, including such exposure to insiders, is minimized.

Figure 5:
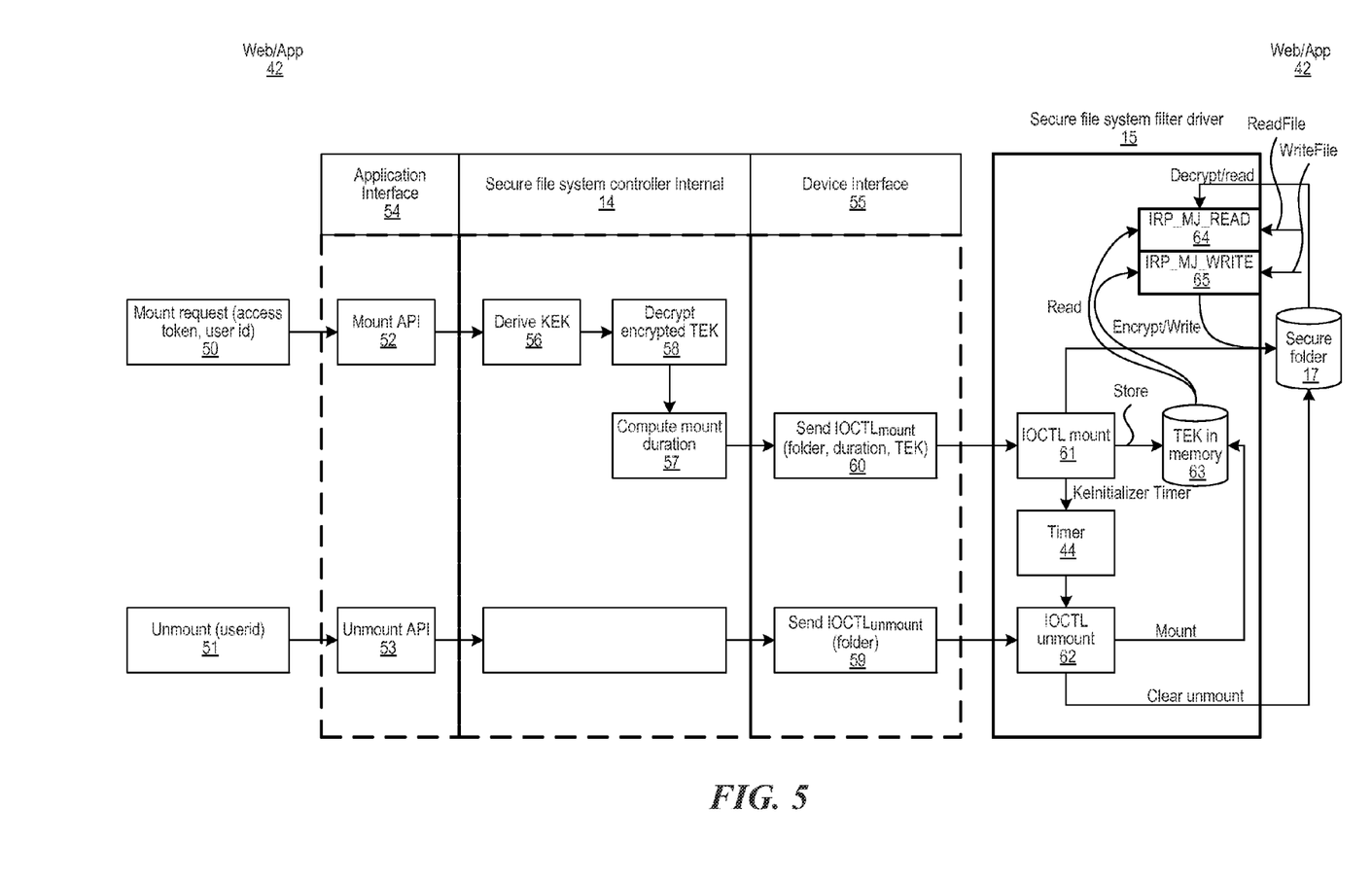
FIG. 5 is a block schematic diagram showing a secure file system controller and secure file system filter driver according to the invention.

FIG. 5 is a block schematic diagram showing a secure file system controller and secure file system filter driver according to the invention. In FIG. 5, a Web app 42 provides the secure file system controller 14, at an application interface 54, with either of a mount request 50 via a mount API 52 or an unmount request 51 via an unmount API 53. The mount request comprises an access token and a user ID, while the unmount request comprises a user ID.

The unmount request is used by the device interface 55 to send IOCTL$_{unmount}$(folder) 59 to an IOCTL unmount facility 62 in the secure file system filter 15. As a result, the IOCTL unmount facility 62 issues a clear signal to clear the TEK from the memory and issues an unmount signal to unmount the secure folder.

For a mount request, information contained in the mount request, as described above, is used to derive the KEK 56. The encrypted TEK is then decrypted 58, and the mount duration is computed 57.

A device interface 55 sends IOCTL$_{mount}$(folder, duration TEK) 60 to an IOCTL mount facility 61 in the secure file system filter driver 15. The IOCTL mount facility stores the TEK in memory 63, mounts the secure folder, e.g. Tenant A's secure folder 17, and sets the mount duration timer 44.

For a read operation, the TEK in memory is used to generate a read control IRP_MJ_-READ 64 to allow the Web app 42 to read a file from the secure folder. For a write operation, the TEK in memory is used to generate an encrypt/write control IRP-_MJ_WRITE 65 to allow the Web app 42 to write to a file in the secure folder.

When the mount duration timer times out, the IOCTL unmount facility 62 issues a clear signal to clear the TEK from the memory and issues an unmount signal to unmount the secure folder.

Computer Implementation

Figure 6:
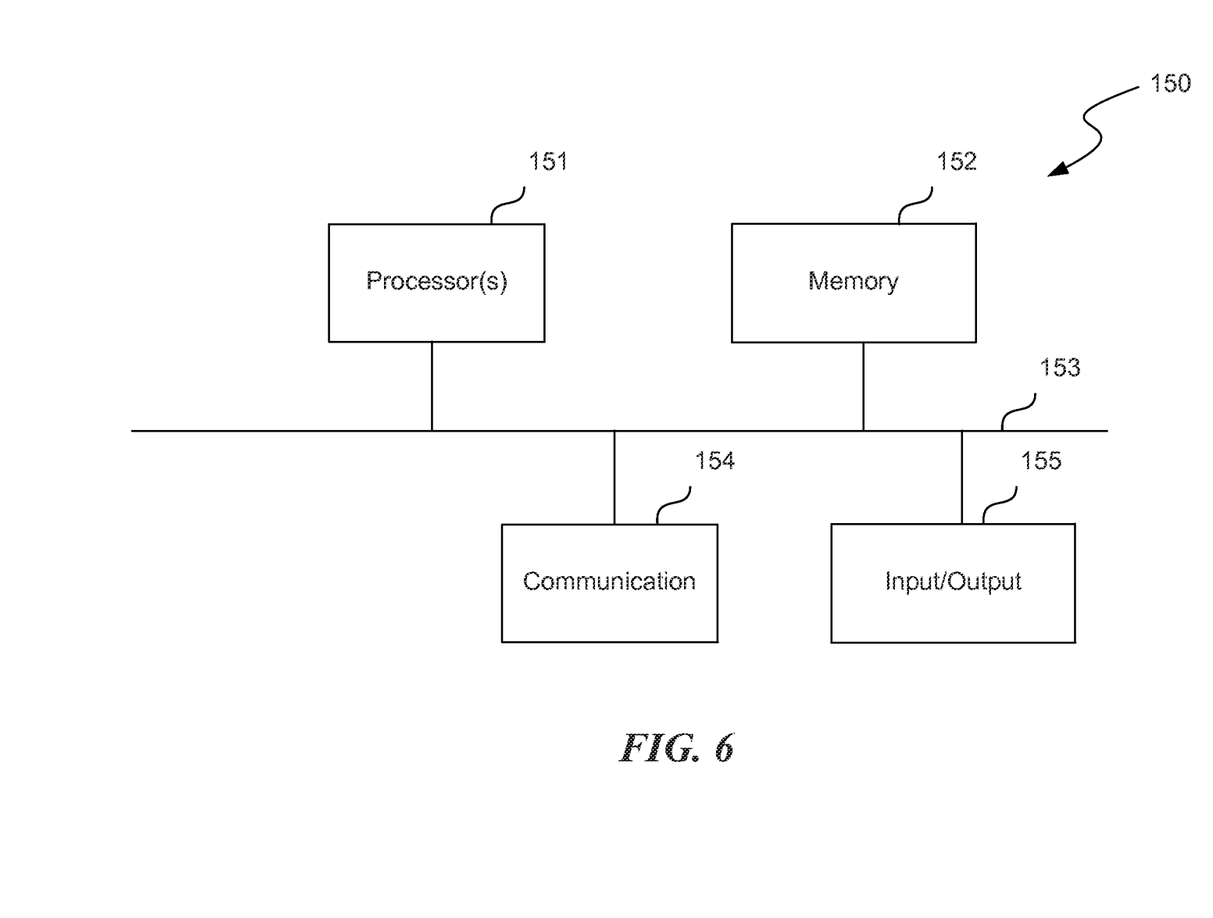
FIG. 6 is a block schematic diagram showing a machine in the example form of a computer system within which a set of instructions for causing the machine to perform one or more of the methodologies discussed herein may be executed.

FIG. 6 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 150 may include one or more central processing units ("processors") 151, memory 152, input/output devices 155, e.g. keyboard and pointing devices, touch devices, display devices, storage devices, e.g. disk drives, and network adapters 154, e.g. network interfaces, that are connected to an interconnect 153.

In FIG. 6, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 152 and storage devices are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in the memory 152 can be implemented as software and/or firmware to program one or more processors to carry out the actions described above. In some embodiments of the invention, such software or firmware may be initially provided to the processing system 151 by downloading it from a remote system through the computing system, e.g. via the network adapter 154.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for minimizing exposure of sensitive tenant information in a multi-tenant/multi-user environment, comprising:

providing a processor for generating a unique tenant encryption key (TEK) for each tenant, wherein said TEK is never stored in the clear and each copy of the TEK is protected by a user derived password;

said processor creating a secure folder for each tenant;

said processor using said TEK to encrypt said secure folder;

said processor only mounting said secure folder to a file system on-demand, in response to an authenticated request received from said tenant; and said processor limiting the interval for which said secure folder is mounted to said file system, said secure folder remaining un-mounted at all other times;

wherein when said secure folder is mounted to said file system, any read/write operation to the secure folder is encrypted/decrypted on-the-fly; and wherein when said secure folder is un-mounted from the file system, all file contents in the secure folder, and the secure folder itself, are not visible in the file system and it is not possible to browse to the secure folder without the TEK;

said processor requiring an encryption key for access to a tenant's secure folder, said encryption key comprising a derived key encryption key:

KEK=PBKDF-2{access_token,user_salt} where said access_token comprises a cryptographic random number tied to a user; and wherein said salt comprises a random number generated per an operator and/or administrator;

said secure folder file system filer driver mounting said requested tenant secure folder for a duration that not longer than that which is required to complete any necessary read/write operations; and said secure folder file system filer driver unmounting said requested tenant secure folder once said read/write operations are completed.

2. The method of claim 1, further comprising:

encrypting/decrypting read/write operations to the secure folder on-the-fly using AES-256.

3. The method of claim 1, further comprising:
said processor receiving tenant access to said file system from a Web user interface.

4. The method of claim 3, further comprising:
said processor implementing a secure folder controller for intermediating tenant access via a Web user interface to said file system; and
said processor implementing a secure folder file system filter driver for receiving intermediated tenant access from said secure folder controller and providing file system access in response thereto.

5. The method of claim 1, further comprising:
said file system containing secure folders for each of a plurality of tenants, wherein each tenant's secure folder contains any of passwords, connection strings, settings, and files.

6. The method of claim 1, further comprising:
said processor protecting said tenant encryption key (TEK) as follows:

encrypted TEK=AES-256-KEK-encrypt{TEK}.

7. The method of claim 1, further comprising:
said processor mounting said tenant's secure folder to said file system in response to a tenant request to access said tenant's secure folder contents received at a secure folder controller from a tenant Web user interface;
said secure folder controller providing said TEK and a tenant secure folder name to a secure folder file system filter driver;
secure folder file system filer driver decrypting said secure folder in said file system using said TEK; and
said secure folder file system filer driver mounting said requested tenant secure folder.

8. The method of claim 1, further comprising:
said processor receiving a file 1/0 write operation to a secure folder from a tenant;
said processor browsing to a requested file system sector block on said tenant's secure folder via a secure folder file system filter driver;
said processor encrypting said file on-the-fly with said TEK; and
said processor writing said encrypted sector block to said file system.

9. The method of claim 1, further comprising:
said processor receiving a file 1/0 read operation for a file from a secure folder from a tenant;
said processor browsing to a requested file system sector block on said tenant's secure folder via a secure folder file system filter driver;
said processor reading said encrypted sector block from file system;
said processor decrypting said file on-the-fly; and
said processor reading said decrypted sector block from said file system.

10. The method of claim 1, further comprising:
said processor implementing a secure file system controller receiving an authenticated input/output/control (IOCTL) request from an application, said IOCTL comprising a requested mount duration and said TEK;
said secure file system filter driver setting a mount duration timer and mounting a secure folder of interest to said file system;
when said secure file is mounted, said processor using said TEK for decrypting file reads and encrypting file writes;
when said mount duration timer times out, said processor issuing an unmount time trigger that unmounts said secure folder from said file system.

11. The method of claim 10, further comprising:
said processor issuing an unmount time trigger that unmounts said secure folder from said file system when said requested mount duration exceeds a predetermined limit.

12. An apparatus for minimizing exposure of sensitive tenant information in a multi-tenant/multi-user environment, comprising:
a hardware processor generating a unique tenant encryption key (TEK) for each tenant, wherein said TEK is never stored in the clear and each copy of the TEK is protected by a user derived password;
said processor creating a secure folder for each tenant;
said processor using said TEK to encrypt said secure folder;
said processor only mounting said secure folder to a file system on-demand, in response to an authenticated request received from said tenant; and
said processor limiting the interval for which said secure folder is mounted to said file system, said secure folder remaining un-mounted at all other times;
wherein when said secure folder is mounted to said file system, any read/write operation to the secure folder is encrypted/decrypted on-the-fly; and
wherein when said secure folder is un-mounted from the file system, all file contents in the secure folder, and the secure folder itself, are not visible in the file system and it is not possible to browse to the secure folder without the TEK;
said processor requiring an encryption key for access to a tenant's secure folder, said encryption key comprising a derived key encryption key:

KEK=PBKDF-2{access_token,user_salt} where said access_token comprises a cryptographic random number tied to a user; and
wherein said salt comprises a random number generated per an operator and/or administrator;
said secure folder file system filer driver mounting said requested tenant secure folder for a duration that is not longer than that which is required to complete any necessary read/write operations; and
said secure folder file system filer driver unmounting said requested tenant secure folder once said read/write operations are completed.

13. The apparatus of claim 12, further comprising:
encrypting/decrypting read/write operations to the secure folder on-the-fly using AES-256.

14. The apparatus of claim 12, wherein said processor receiving tenant access to said file system from a Web user interface, said apparatus further comprising:
a secure folder controller for intermediating tenant access via a Web user interface to said file system; and
a secure folder file system filter driver for receiving intermediated tenant access from said secure folder controller and providing file system access in response thereto.

15. The apparatus of claim 12, further comprising:
said file system containing secure folders for each of a plurality of tenants, wherein each tenant's secure folder contains any of passwords, connection strings, settings, and files.

16. The apparatus of claim 12, further comprising:
said processor protecting said tenant encryption key (TEK) as follows:

encrypted TEK=AES-256-KEK-encrypt{TEK}.

17. The apparatus of claim 12, further comprising:
- said processor mounting said tenant's secure folder to said file system in response to a tenant request to access said tenant's secure folder contents received at a secure folder controller from a tenant Web or application interface;
- said secure folder controller providing said TEK and a tenant secure folder name to a secure folder file system filer driver;
- secure folder file system filer driver decrypting said secure folder in said file system using said TEK; and
- said secure folder file system filer driver mounting said requested tenant secure folder.

18. The apparatus of claim 12, further comprising:
- said processor receiving a file 1/0 write operation to a secure folder from a tenant;
- said processor browsing to a requested file system sector block on said tenant's secure folder via a secure folder file system filter driver;
- said processor encrypting said file on-the-fly with said TEK; and
- said processor writing said encrypted sector block to said file system using normal file 1/0 operations.

19. The apparatus of claim 12, further comprising:
- said processor receiving a file 1/0 read operation for a file from a secure folder from a tenant;
- said processor browsing to a requested file system sector block on said tenant's secure folder via a secure folder file system filter driver;
- said processor reading said encrypted sector block from file system;
- said processor decrypting said file on-the-fly; and
- said processor reading said decrypted sector block from said file system using normal file 1/0 operations.

20. The apparatus of claim 12, further comprising:
- said processor implementing a secure file system controller receiving an authenticated input/output/control (IOCTL) request from an application, said IOCTL comprising a requested mount duration and said TEK;
- said secure file system filter driver setting a mount duration timer and mounting a secure folder of interest to said file system;
- when said secure file is mounted, said processor using said TEK for decrypting file reads and encrypting file writes;
- when said mount duration timer times out, said processor issuing an unmount time trigger that unmounts said secure folder from said file system.

21. The apparatus of claim 20, further comprising:
- said processor issuing an unmount time trigger that unmounts said secure folder from said file system when said requested mount duration exceeds a predetermined limit.

* * * * *